No. 785,084. PATENTED MAR. 21, 1905.
W. L. BUNDY.
TIME RECORDER.
APPLICATION FILED MAY 3, 1900.

WITNESSES:
John O. Gempler
John A. Clark

INVENTOR
Willard L. Bundy
BY
Kenyon & Kenyon
ATTORNEYS

No. 785,084. PATENTED MAR. 21, 1905.
W. L. BUNDY.
TIME RECORDER.
APPLICATION FILED MAY 3, 1900.

WITNESSES:
John O. Templer
John A. Clark

INVENTOR
Willard L. Bundy
BY
Kenyon & Kenyon
ATTORNEYS

No. 785,084. PATENTED MAR. 21, 1905.
W. L. BUNDY.
TIME RECORDER.
APPLICATION FILED MAY 3, 1900.

No. 785,084. PATENTED MAR. 21, 1905.
W. L. BUNDY.
TIME RECORDER.
APPLICATION FILED MAY 3, 1900.

WITNESSES:
INVENTOR
Willard L. Bundy
BY
Kenyon & Kenyon
ATTORNEYS

No. 785,084. PATENTED MAR. 21, 1905.
W. L. BUNDY.
TIME RECORDER.
APPLICATION FILED MAY 3, 1900.

WITNESSES:

INVENTOR
Willard L. Bundy
BY
Kenyon & Kenyon
ATTORNEYS

No. 785,084. PATENTED MAR. 21, 1905.
W. L. BUNDY.
TIME RECORDER.
APPLICATION FILED MAY 3, 1900.

WITNESSES:

Willard LeGrand Bundy
INVENTOR

BY
Kenyon & Kenyon
ATTORNEYS

No. 785,084.

Patented March 21, 1905.

UNITED STATES PATENT OFFICE.

WILLARD L. BUNDY, OF BINGHAMTON, NEW YORK, ASSIGNOR, BY MESNE ASSIGNMENTS, TO INTERNATIONAL TIME RECORDING COMPANY, A CORPORATION OF NEW JERSEY.

TIME-RECORDER.

SPECIFICATION forming part of Letters Patent No. 785,084, dated March 21, 1905.

Application filed May 3, 1900. Serial No. 15,312.

*To all whom it may concern:*

Be it known that I, WILLARD LE GRAND BUNDY, a citizen of the United States, and a resident of Binghamton, in the county of Broome and State of New York, have invented certain new and useful Improvements in Time-Recorders, of which the following is a specification.

My invention relates to time-recorders, and particularly to workmen's time-recorders in which the workmen write their names or make their marks upon a recording-strip. It has for its object to improve and simplify the printing mechanism of a time-recorder, to make such mechanism more efficient, and to cause the platen to print more distinctly and sharply upon the recording-surface; also, to provide a shutter to cover normally the opening through which the workmen write upon the recording-strip and to lock the same in closed position, except when the impression mechanism is operated, in order to prevent access to the recording-strip except as the recorder is operated and to prevent tampering with the parts; also, to provide means for removing the shutter from its closed position at each operation of the machine and for returning it to such closed position; also, to provide improved means for actuating the moving parts of the recorder; also, to provide means for preventing the return of the operating parts after they have begun their movement in either direction until the said movement has been completed, thus preventing a partial operation of the machine; also, to provide new and improved means for mounting the record-strip reel and connecting it with its rotating mechanism to permit the reel to rotate independently of its rotating mechanism or to be driven thereby, as desired; also, to provide means to prevent an overfeed of the record-strip and to prevent a too rapid actuation of the recorder by workmen; also, to provide new and improved inking devices and new and improved means for feeding an ink-ribbon and for reversing the feed; also, to provide new and improved means for printing the minutes upon the record-strip.

It consists in the novel devices and combinations herein shown and described.

In the drawings accompanying this specification and forming part hereof I have shown and will now proceed to describe the preferred form of my invention, similar reference characters in the different figures representing corresponding parts.

Referring to the specific embodiment of my invention shown in the drawings.

Referring now to the specific embodiment of my invention shown in the drawings, 1 represents the casing of the recorder, and 2 is an inclined portion of the casing on the front of the machine. This inclined portion is provided with an opening 3, through which the workman writes his name upon the recording-strip, as hereinafter described. Below the opening 3 is a shutter or cover 4, pivoted at 5 to the unnderlying portion 6 of the casing. Normally this shutter lies under opening 3 to prevent the workman having access to the recording-strip except when the machine is operated.

7 is an operating-handle or device which is connected with the impression mechanism, shutter 4, and other parts of the apparatus in a manner presently to be described and which when operated by the workman removes the cover 4 from over the recording-strip 8 to permit the workman to write upon that strip, operates the impression mechanism to print the time upon the strip and feed forward the recording-strip and inking-ribbon 9, as will be presently described. In its complete operation it returns the cover and some other parts of the apparatus to their normal positions.

10 represents the clock-movement, which may be of any desired character. The clock-movement drives hour-recording wheel 11 and minute-recording wheel 12 synchronously with itself through flexible shaft 13 and connecting gearing and mechanism, which may be of any suitable character. As these driving means form no part of my present invention and as in the form shown in the drawings they are of the same construction as shown and described in an earlier patent of mine, No. 671,128, they will not be further described.

The recording-strip 8 passes from a roll 14 over the forward portion of the inclined under part of the casing 6, under shutter 4 and opening 3, and thus down through an opening 15 in casing 6, around a roller 16, with one of its edges passing directly in front of the hour and minute recording wheels 11 and 12, thence around rollers 17 and 18 up to and around reel 19. By means of this arrangement the paper is first presented to the workman for his autograph signature. It then passes in front of the time-recording wheels and receives the imprint of the hour and minute along one edge and upon the same side of the paper upon which the workman has written his name.

Figure 11:
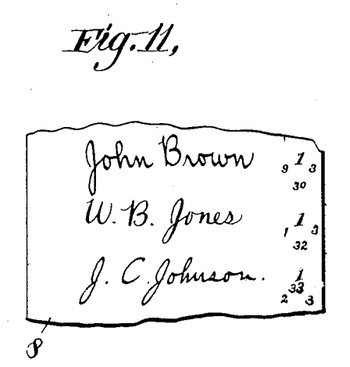
Fig. 11 represents a portion of the recording-strip, showing the names written and the time printed thereon.
Figure 12:
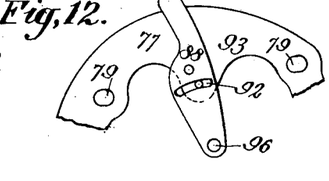
Fig. 12 is a detail of the ink-feeding mechanism.
Figure 13:
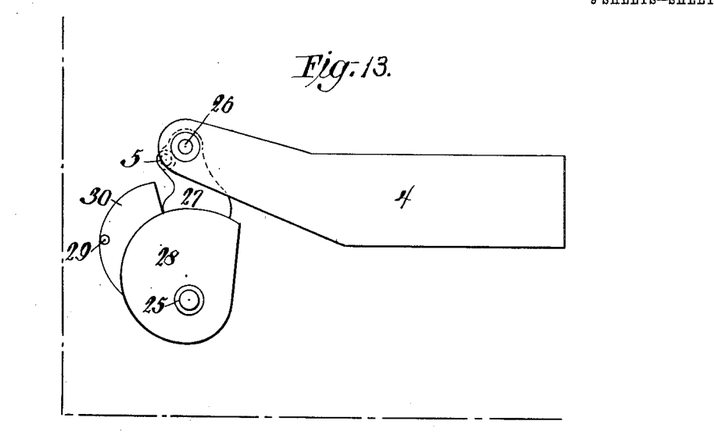
Fig. 13 is a detail of the cover and means for operating the same.

By my improved arrangement the parts for the time and the signatures lie both upon the same side of the paper, as clearly shown in Fig. 11, and can be easily and accurately read.

The recording-strip is fed forward by means of devices for rotating reel 19 in a manner presently to be described.

Ink-ribbon 9 is mounted upon two reels 20 and is fed from one reel to the other in one direction or the other, as desired, by means presently to be described. The ribbon in its course passes around idle rollers 21 21 and between the hour and minute recording-wheels and platen 22.

Platen 22 is mounted on a swinging arm 23. This arm is secured to a rock-shaft 24, which is rocked in a manner presently to be described for the purpose of actuating the platen.

Figure 1:
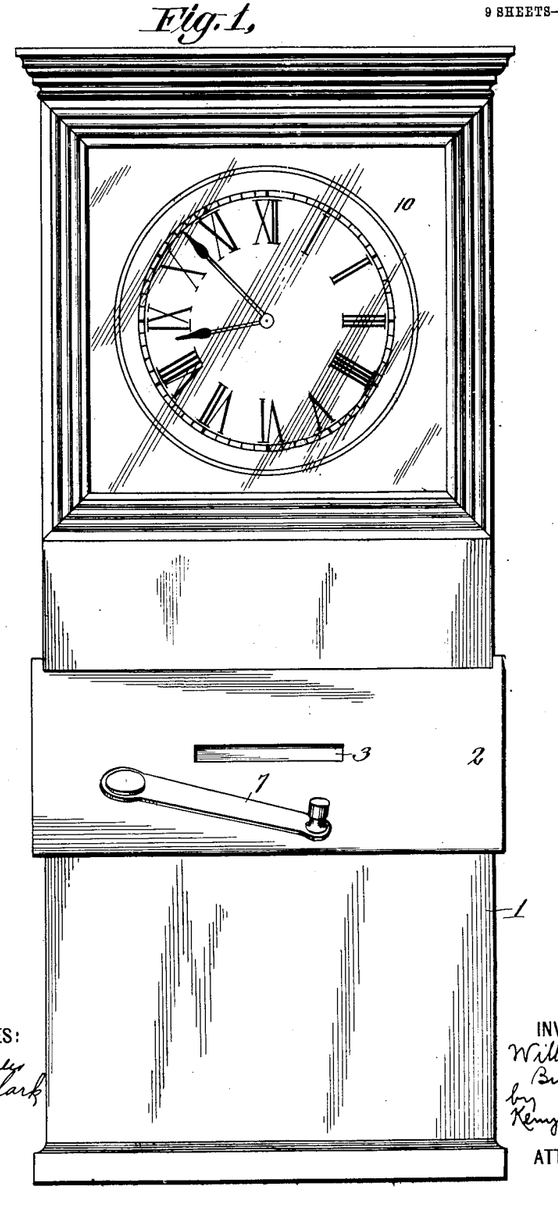
Figure 1 is a face view of a time-recorder embodying my invention in its preferred form.
Figure 2:
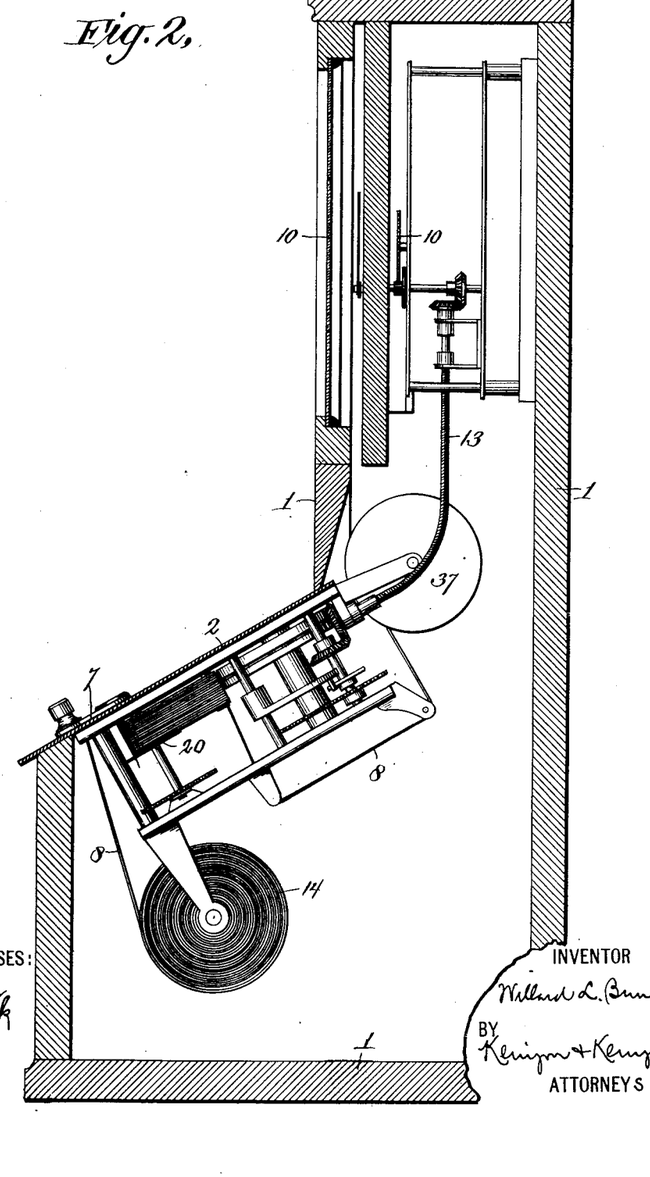
Fig. 2 is a side view of the same with the casing removed.
Figure 3:
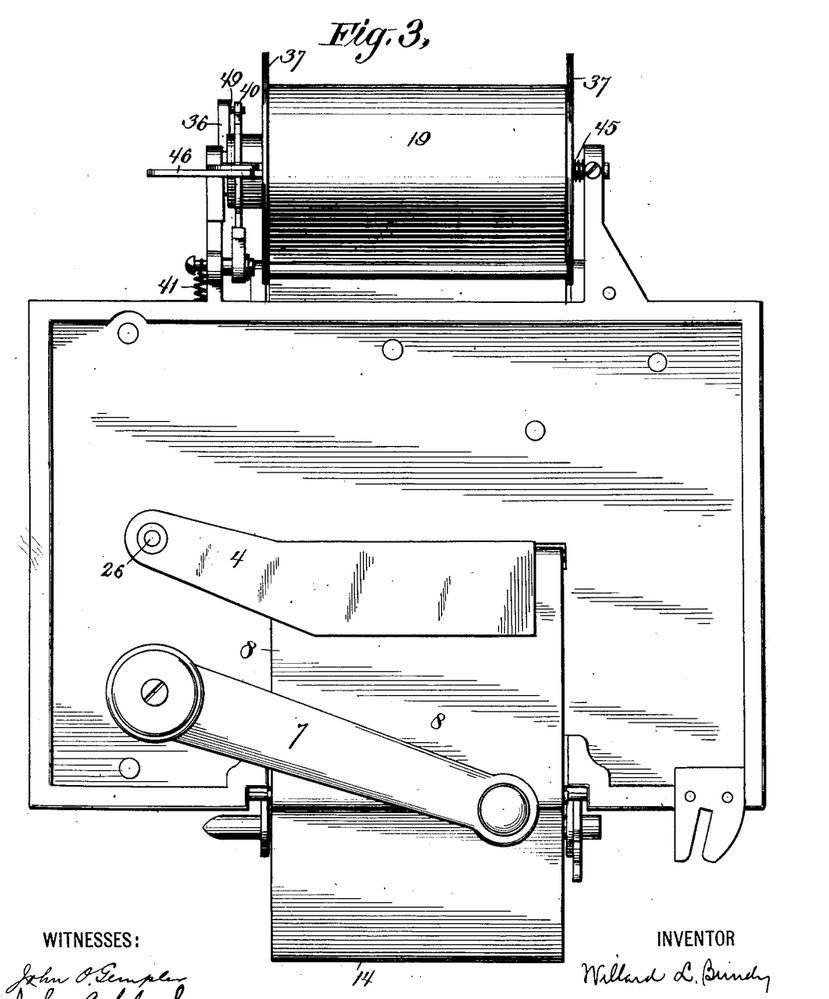
Fig. 3 is a top view of the parts shown in Fig. 5 viewed as shown by the arrow.
Figure 4:
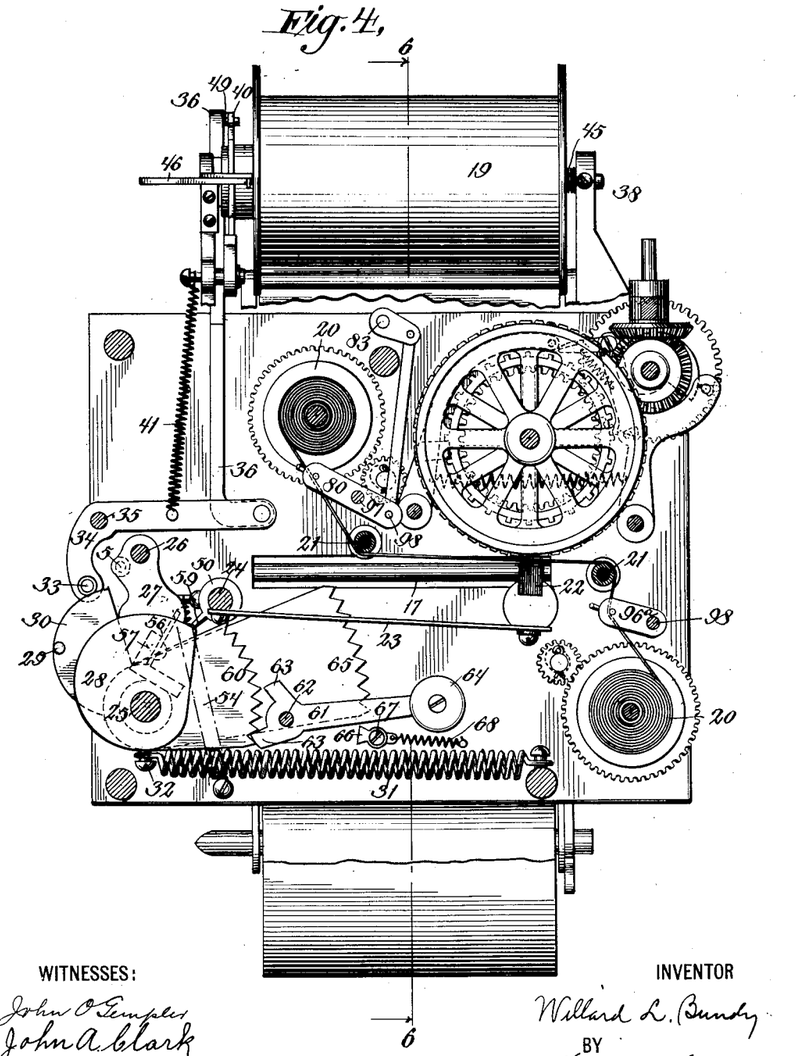
Fig. 4 is a top view taken on the lines 4 4 of Fig. 5 viewed as shown by the arrow.

In the embodiment of my invention shown in the drawings the cover is removed from under the opening and over the recording-strip, the impression mechanism is operated, and the recording-strip and inking-ribbon are fed forward by the workman moving the operating handle or device 7. This is accomplished in the following manner: Handle 7 is mounted upon a rock-shaft 25. The first of these operations to take place is that of removing the shutter from the opening. This is accomplished, as shown, by the following means: In its normal position shutter 4 lies under opening 3 and is locked in that position by the following mechanism: A pin 26 runs from the under side of shutter 4 and is secured to a piece 27. It therefore turns, with shutter 4, on pivot 5. The face of piece 27 is dish-shaped or hollowed out to register with the outer curve of a spiral cam 28, mounted on rock-shaft 25. These parts are shown in Fig. 4 in their normally locked position, the shape and engagement of piece 27 with spiral cam 28 preventing piece 27 and shutter 4 from being turned one way or the other. As rock-shaft 25, with operating-handle 7, turns toward the right, as shown in Fig. 4, toward the end of the movement the spiral cam dish-shaped piece 27 is released, so as to permit the shutter to be moved so as to withdraw the shutter from under opening 3, preferably positively, by means of a pin 29, mounted on a piece 30, secured to and moved with rock-shaft 25. Pin 29 toward the right of the forward movement of operating-handle 7 strikes piece 27 after it has been released from spiral cam 28 and forces piece 27 to the right, as shown in Fig. 4, throwing shutter 4 upward and removing it from the opening. The parts are preferably so arranged that this movement of the shutter does not take place until toward the end of the outward movement of handle 7, and the movement of the shutter is a steady and positive one. By these means the workman is prevented from working the shutter back and forth, as can be done in all other machines of this general character, and feed the paper without printing or causing the printing to be so close together as to be illegible. These defects are inherent in prior machines of the general character of the one disclosed herein and form serious drawbacks to the success of such machines. These defects are entirely removed by my improved construction. After the workman has completed the forward movement of handle 7, and thus uncovered the recording-strip, he writes his name upon the strip and then releases handle 7. This handle is returned to its normal position by means of spring 31, (shown in Fig. 4,) one end of which is secured to a part of the casing and the other end to a pin 32, secured to rock-shaft 25, thus returning the rock-shaft to its normal position. As rock-shaft 25 returns it moves piece 30 and pin 29 out of the way of piece 27 and causes spiral cam 28 to move to the left, as shown in Fig. 4, to its original position. In thus moving to the left cam 28 strikes against piece 27 and moves it back to its original position, thus returning the shutter, so as to cover the opening, and again locking it in that position.

During the outward and return movement of the operating-handle the means for feeding forward the recording-strip are actuated. This feeding takes place before the hour and minute are imprinted upon the strip, so as to bring the edge of the line of the paper upon which the workman has just written between the hour and minute recording wheels and the impression-platen. This feeding of the paper-strip is accomplished in the form of my invention shown in the drawings by the following described mechanism: Bearing upon the surface of piece 30 is a roller 33, secured to a rock-shaft 34, pivoted at 35 in the casing. Pivotally secured to the farther end of rock-shaft 34 is a rod 36, loosely mounted upon an arm 37, loosely secured to stud 38. Arm 37 carries near its outer end a pawl 39, which meshes with a ratchet-wheel 40, fixedly secured to stud 38, which forms the axis upon which reel 19 is loosely mounted. As piece 30 moves to the right while operating-handle 7 is moved downward, the curve of piece 30 (shown in Fig. 4) permits rock-shaft 34 to move under the strain of spring 41, thus raising rod 36. This movement permits pawl 39 to move backward and engage with the next tooth of ratchet-wheel 40. As piece 30 moves back to the left while handle 7 is returning to its normal position, its periphery strikes against roller 33 and returns rock-shaft 34 to its normal position, as shown in Fig. 4. This pulls rod 36 downward, causing pawl 39 to feed ratchet-wheel 40 forward one tooth.

Figure 10:
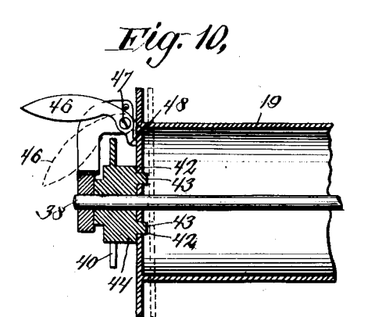
Fig. 10 is a detail of the paper-roll and connections.

Preferably reel 19 is provided at one end, as shown in Fig. 10, with two openings 42 42, into which pins 43, projecting from the hub 44 of ratchet-wheel 40, are adapted to enter when the reel is pushed to the left, as shown in Fig. 10. The reel is normally held in this position by means of spring 45 at the other end of reel 19, as shown in Fig. 4. When pins 43 engage with openings 42, reel 19 rotates with ratchet-wheel 40. I preferably provide means for forcing reel 19 out of engagement with pins 43 and for holding it out of engagement, so as to permit the reel to be rotated independently of ratchet-wheel 40. As shown, this device for separating the reel from its rotating means consists of a handle 46, pivoted at 47 and having a rounded end 48 to bear against the face of one end of the reel. When the handle 46 is in the position shown in full lines in Fig. 10, it permits spring 45 to force and hold the reel against hub 44, projections 43 engaging with openings 42. This is the normal position when the time-recorder is in operation. When it is desired to throw the reel out of operative position, handle 46 is depressed into the position shown in dotted lines in Fig. 4, when rounded end 48 presses against the end of the reel, forcing it into the position shown in dotted lines in Fig. 10. In this position projections 43 clear openings 42. In this position of the parts the paper can be rapidly removed from the reel. By these means the reel and its rotating means are removably connected together, so that when they are connected the reel will be rotated and the strip be fed, and when they are disconnected the reel may be turned independently of the rotating means.

Figure 5:
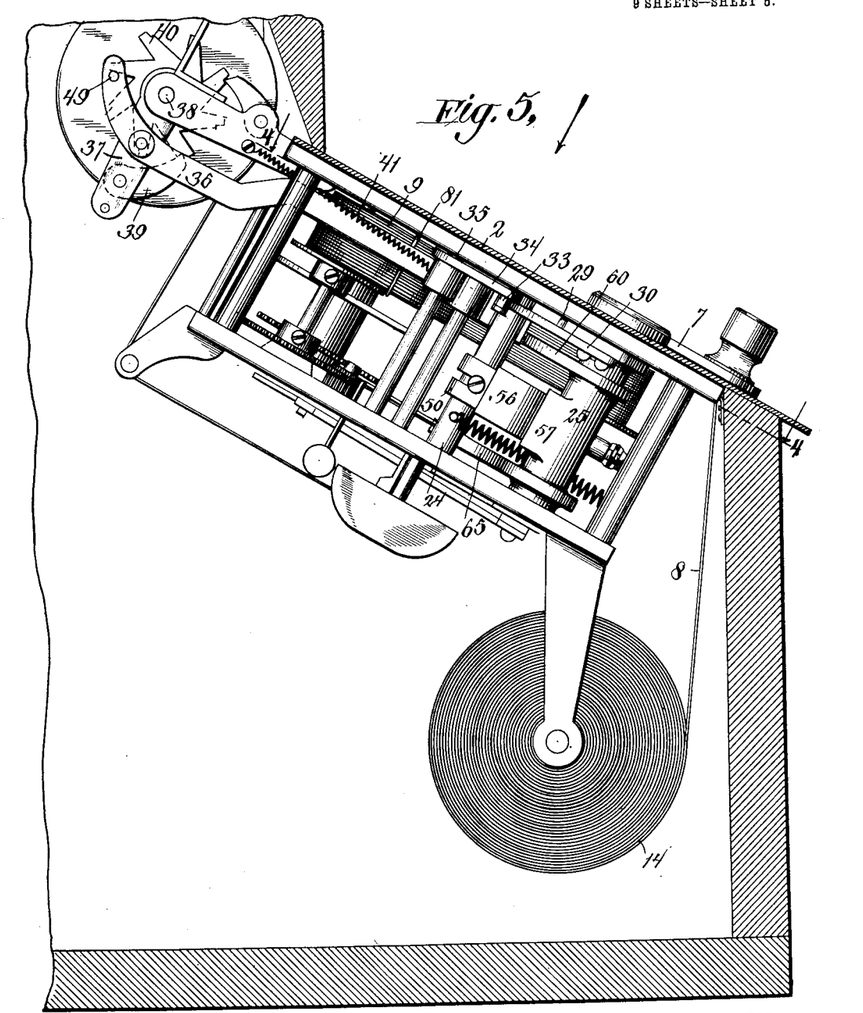
Fig. 5 is a side view of the apparatus of the said time-recorder with the casing removed and excepting the clock-movement.

In order to prevent paper from the recording-wheel from rotating too far and from overfeeding the paper, I preferably mount upon the end of rod 36 a pin 49. When rod 36 is drawn downward, pin 49 enters the opening between two of the teeth, as shown in Fig. 5, sufficiently to prevent ratchet-wheel 40 from being fed more than one tooth. Pin 49 is, however, so near the end of the tooth with which it engages that it is withdrawn from engagement with this tooth when pawl 39 commences the feeding movement.

Figure 6:
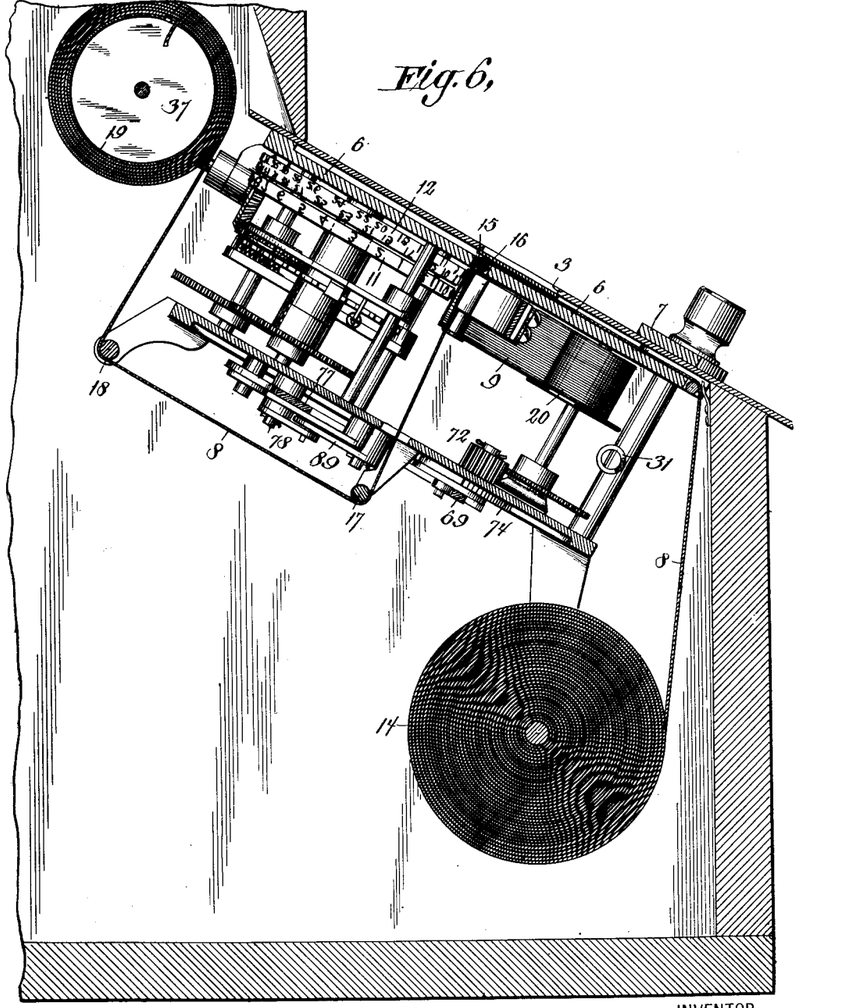
Fig. 6 is a vertical section taken on the lines 6 6 of Fig. 4 viewed as shown by the arrow.

By means of my improved paper-feeding mechanism and its arrangement in connection with the time recording and impression mechanism the strip is fed forward before the time is recorded upon it and after the workman has written his name, and the time is printed opposite the name upon the same side of the recording-strip. By these means the paper strip is exposed for the autograph of the workman at the top of the machine without interfering with the arrangement of the time-recording wheels in a lower part of the casing, where it must necessarily be placed, and without interfering with the arrangement of such wheels, which always produces the best results. With such an arrangement I find it preferable to so arrange the hour and minute recording wheels that the hour and minute will be printed one above the other, as shown in Fig. 11. As it is usually necessary to have the type representing the minutes close together and as in such a construction it is difficult, if not impossible, to prevent the printing not only of the exact minute but also of the adjoining minute on each side, I preferably arrange the type of the minute-wheel in a staggered order with type representing adjoining minutes arranged angularly on opposite edges of the periphery of the minute-wheel. By "staggered" I mean the placing of the type-representing the minutes around the periphery of the wheel in two columns, as shown in Fig 6, with the type representing alternate minutes in the same column, so that any minute and the next minute will be on opposite sides of the periphery of the wheel. With this staggered arrangement the exact minute will be printed immediately in line with the hour, and one figure only of the minute adjoining on each side will be printed upon the strip; but they will not be printed in line with the number representing the hour, as clearly shown in Fig. 11. With the mechanism shown in the drawings the odd minutes are printed closer to the number representing the hour than are the even minutes, and figures from adjoining minutes are not in horizontal line with the exact minute. This is due to the staggered arrangement of the minute-numbers on the minute-wheel and greatly facilitates the easy and accurate reading of the recording-strip.

Although I prefer to arrange the type upon the hour and minute recording wheels with the line of direction of the figures transverse to the plane of the wheel, by which arrangement the hour and minute will be printed one above the other on the record-strip, as stated above, such an arrangement is not essential, as the type upon the hour and minute recording wheels may be arranged with the line of direction of the figures arranged in the usual way—*i. e.*, running around in the direction of the circumference of the wheels. In either case with the staggered arrangement upon the minute-wheel the type representing the hour and minute at which the time-recorder is operated will be in line with each other, whereas the type representing the hour and that of the minute adjoining the correct one on either side will not be in line with each other. It is not essential, of course, to this part of my invention that all of the minutes be arranged upon the minute-wheel, as the minute-wheel might, as is often the case, be provided with only type representing minutes at regular intervals—as, for example, every five minutes.

Figure 9:
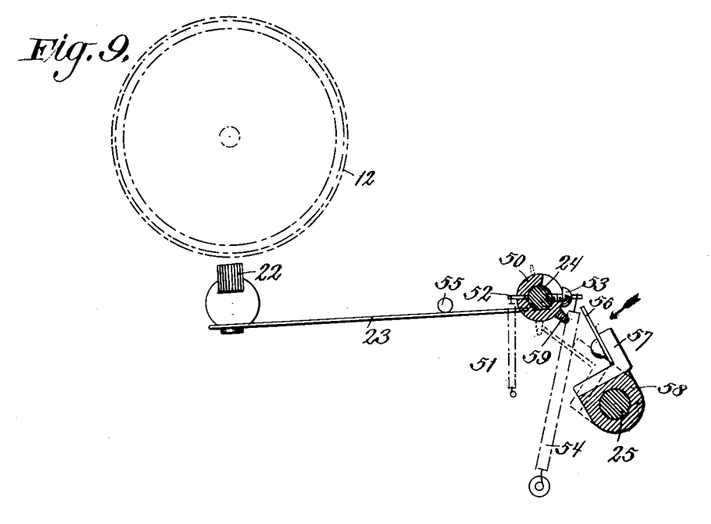
Fig. 9 is a detail of part of the impression mechanism.

The impression-operating mechanism is actuated in the form shown in the drawings by means of the following described mechanism. Preferably the platen 22 is caused to deliver its blow on the return of the operating-handle 7 to its normal position and toward the close of the return movement, thus causing the printing of the time to be substantially the last act of the operation of the machine. This prevents the workman from obtaining a record of any earlier time than he is entitled to. Rock-shaft 24, which carries swinging arm 23 and platen 22, is rocked in the following way: 50 is a sleeve movably mounted upon platen-support 24. It is spring-pressed in one direction in the direction of the arrow shown in Fig. 9 by means of spring 51, secured at one end to a pin 52, projecting from sleeve 50, and at its other end secured to the casing. 53 is a stop-pin secured to rock-shaft 24. One end of sleeve 50 normally is held against stop-pin 53 by means of spring 51. (Shown in Fig. 9.) A spring 54, connecting at one end to pin 53 and at the other end to the casing, normally holds arm 23 and platen 22 in the position shown in Fig. 9. In this position of the parts arm 23 rests against a stop 55, arranged between the platen and the point where arm 23 is mounted on rock-shaft 24. The stop 55 is so arranged that arm 23 will strike it just before the platen 22 engages with the type on the face of the hour and minute wheels. 56 is a plate secured to support 57, forming part of a sleeve 58, securely fastened to rock-shaft 25 and moving with it. 59 is a pin projecting from sleeve 50. The operation of these parts is as follows: When the workman moves operating-handle 7 in its forward or outward direction, plate 56 moves outward and to the left in the direction of the arrow shown in Fig. 9 and in its movement strikes against pin 59, which projects into its path, pushing it and sleeve 50 to the left and straining spring 51. When plate 56 passes pin 59, the latter and sleeve 50 are pulled by spring 51 back to their position, sleeve 50 resting against stop 53. On the return stroke of handle 7 plate 56 moves backward and strikes pin 59, rocking it and with it rock-shaft 24, arm 23, and platen 22 and moving platen 22 away from the type on the hour and minute recording wheels and straining spring 54. The moment plate 56 clears pin 59 spring 54 causes arm 23 and platen 22 to be thrown upward. Arm 23 strikes stop 55; but as arm 23 is sufficiently elastic or spring-like platen 22 is thrown sharply against the type on the hour and minute recording wheels, but instantly recedes. By these means a sharp quick solid blow of the impression-platen is given upon the inking-ribbon and type, printing the hour and minute in clear, legible, and sharply-outlined characters. I find in practice that by using stop 55 much clearer, sharper, and better results are obtained in the printing than in any platen-operating mechanism known to me.

The above operating mechanism is simple and useful and produces excellent results. The connection between the platen and the actuating device is arranged and adapted to yield without actuating the platen when the platen-actuating device 56 is moved in one direction, but to transmit motion from that actuating device to the platen to cause it to deliver the printing blow when the device is moved in the opposite direction. This is accomplished in the form shown in the drawings by means of the sleeve 50, which is movable in one direction without operating the platen, but cannot be moved in the other direction without actuating it.

I have found in practice that workmen will often try to disarrange the working of a time-recorder by moving the operating-handle very rapidly, thus causing an overfeed of the recording-strip or inking-ribbon or interfering in other ways with the proper operation of the work of the machine. I preferably, therefore, use a device somewhat similar to the escapement-wheel of a clock-movement for preventing a too rapid movement of operating-handle 7. The mechanism shown for this purpose consists of a toothed segment 60, securely mounted upon shaft 25 and rocking therewith. 61 is a rocking piece, pivoted at 62 of the framework of the machine and provided with two teeth 63 63, adapted to engage one at a time with the teeth of segment 60. I preferably place upon the end of rocking piece 61 a weight 64 to increase inertia of the movement of the rocking piece. With such a device it is impossible to move operating-handle 7 beyond a certain prescribed speed. I have also found that it is essential in the practical operation of a workmen's time-recorder to prevent the workmen from moving the operating-handle backward before the entire movement of the handle and the operation of the machine have been completed. To accomplish this, I provide a locking device for preventing the backward movement of operating-handle 7 when moving in either direction until the movement in that direction has been completed. For this purpose I provide a toothed segment 65, rigidly secured to rock-shaft 25, and a swinging double-faced pawl 66, pivoted in the framework of the machine at 67 and normally held in its central position by a spring 68. As handle 7 is turned in its forward position the teeth of the segment 65 strike and mesh with rocking pawl 66 immediately after the movement of handle 7 begins. One side of the double-faced pawl engages with the teeth of the segment and prevents the segment and with it rock-shaft 25 and handle 7 from being moved backward until the full movement of the handle 7 has been completed, at which time the teeth of segment 65 have cleared rocking pawl 66. On the return of the segment 65 rocking pawl 66 is rocked the other way, and the other face then locks the segment from any return of the movement. The handle and the operating parts of the machine are thus prevented from being moved backward in either direction until the movement in that direction has been completed. The workman when he once begins the movement of the handle cannot restore the parts to their normal position until he has proceeded regularly and in order through the entire operation of the machine.

Figure 7:
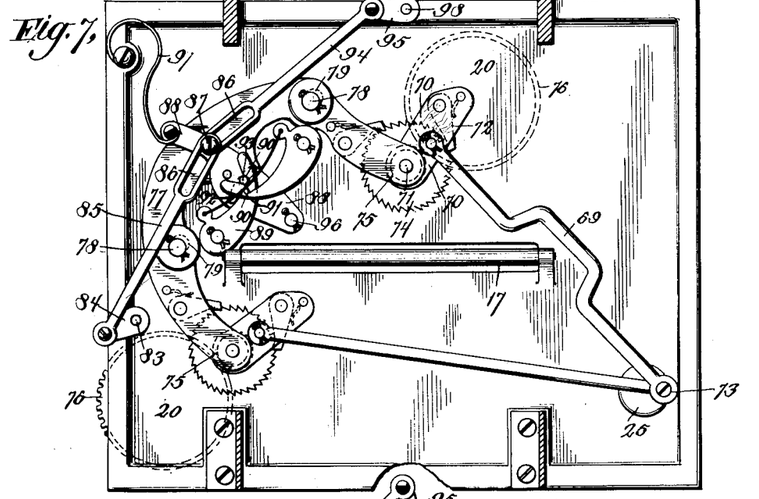
Figs. 7 and 8 are detail views of the ink-ribbon feeding and reversing mechanism viewed from the bottom as the parts are shown in Fig. 5.
Figure 8:
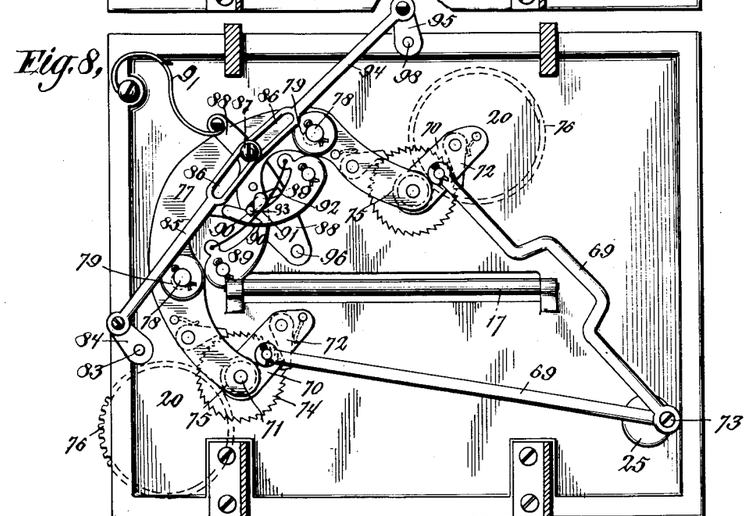
Figure 14:
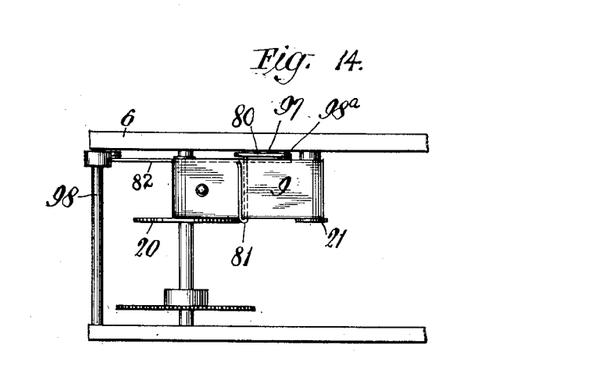
Fig. 14 is a detail showing the method for reversing the ink-feeding mechanism.

The means shown in the drawings for operating the inking mechanism is as follows: Referring to Fig. 7 of the drawings, 20 20 are reels carrying the inking-ribbon. The ribbon passes from one to the other of these reels by the following means: The inking-ribbon is fed forward at each actuation of the operating handle or device 7 by means of arms 69 69, pivoted to the extreme end of the shaft 25, upon which the operating device or handle 7 is mounted. These arms 69 69 are pivoted, by means of the pivot 73, to the right of the center of the shaft 25. This feeding mechanism is arranged so that only one of its feeding mechanisms is in operation at a time. Each feeding mechanism consists of an arm 70, loosely mounted on shaft 71 and carrying a spring-pressed pawl 72 and oscillated by arm 69 as rock-shaft 25 moves to the right or left. Pawl 72 engages with the teeth of ratchet-wheel 74, loosely mounted on shaft 71. A gear 75 is connected with ratchet-wheel 74 and is adapted at times to mesh with gear 76 on reel 20. When one gear 75 is in mesh with gear 76 of one of the reels, the other gear 75 is out of mesh with the gear 76 of the other reel. This is accomplished by means of the following mechanism: Both shafts 71, with their ratchet-wheels 74, are carried by sliding plate 77, which is secured to the framework of the machine by means of pins 78, projecting from the framework of the machine through the slots 79 in the sliding plate. This fastening is such as to hold plate 77 stationary except when moving positively, as described hereinafter. 80 is an arm pivoted at its center by pivot 97 to the framework of the machine and having projecting from one end thereof a bent wire 81. A knot is secured near each end of the ink-ribbon, which catches in bent wire 81 (shown in Fig. 14) when it is desired to feed the ink-ribbon in the other direction, this rocking arm 80, Fig. 4, and moving arm 82 upward and partially revolving shaft 98, upon which is pivoted arm 95, Fig. 7. In the position of the parts shown in Fig. 7 the feeding mechanism is in mesh with the lower reel 20. In this position of the parts when arm 80 is rocked, it thereby rocks shaft 98 and draws arm 95 upward, thereby pulling arm 94 in an upward direction. Arm 94 has at its lower end a slot 86, in which plays pin 87, secured to lever 88. In the position of the parts shown in Fig. 7 pin 87 is at the lower end of slot 86. The upward pull of arm 94 therefore rocks lever 88 upward on its pivot 96. 89 89 are two levers pivoted in the framework of the machine, each having a notch 90 in its surface. 91 is a bowed spring connecting the two ends of the levers 89 89 and tending to separate the ends thus connected. Lever 88 has near its center a slot 92, through which projects a pin 93, projecting from the sliding plate 77. With the parts in the position shown in Fig. 7 the lower lever 89 rests with its nose against pin 93, projecting from the lever 77, which holds lever 88 from moving upward, pulled by arm 94. One of the levers 89 follows pin 93 until its notch 90 stands opposite to but does not engage with pin 93 of plate 77. In the further movement of lever 88 the farther end of slot 92 reaches pin 93 and pulls it and with it plate 77 upward, thereby disengaging lower gear-wheel 75 from gear-wheel 76 of the lower reel 20 and causing the upper gear-wheel 75 to mesh with the upper gear 76 of the upper reel 20, as shown in Fig. 8. At the same time notch 90 of the upper lever 89 snaps behind pin 93 and holds the parts in this position until a similar knot at the other end of the inking-ribbon engages with a similar bent wire on lever 96, (shown in Fig. 4,) which is pivoted directly to the shaft upon which arm 84 is mounted. Lever 96ª rocks shaft 83. Lever 96ª is pivoted to shaft 83, upon the end of which is fixedly mounted arm 84, connected, by means of a pivot, to arm 85. When the knot at the other end of the inking-ribbon engages with the bent wire of the arm 96ª, it partially revolves the shaft 83, thereby lowering arm 84 and pulling the arm 85 downward just as arm 94 was pulled upward, as above described, thus reversing the position of the parts and bringing them into the position shown in Fig. 7 and feeding the inking-ribbon in the reverse direction.

By means of my invention all the work of the machine, except the synchronous driving of the time-recording wheels, is performed by the workman through the operation of handle 7, and this operation once begun must be proceeded with regularly and in order until the entire operation has been completed. The autographs and the recording of the time of each appear upon the same side of the recording-strip. The record of the time is made clear, distinct, and legible. Overfeeding of the paper strip, inking-ribbon, and other parts is prevented, and the shutter or cover is locked in position until the proper time comes for the workman to write upon the recording-strip.

Many modifications may be made in the form of apparatus shown in the drawings, and many changes may be made therein without departing from my invention.

What I claim as new, and desire to secure by Letters Patent, is—

1. The combination of a platen, an arm for moving the platen, a device for moving the arm and actuating the platen, a connection between the arm for moving the platen and its actuating device arranged and adapted to yield without actuating the platen when the actuating device is moved in one direction, and to transmit motion from the actuating device to the platen to cause it to deliver a printing blow when the actuating device is moved in the other direction, a stop in the path of movement of the arm arranged so that the arm will strike the stop before the platen delivers its blow, whereby the platen will be caused to deliver a sharp, whip-like blow.

2. The combination of a platen, an arm for moving the platen, a device for moving the arm and actuating the platen, a connection between the arm for moving the platen and its actuating device arranged and adapted to yield without actuating the platen when the actuating device is moved in one direction, and to transmit motion from the actuating device to the platen to cause it to deliver a printing blow when the actuating device is moved in the other direction, and a stop so arranged between the platen and the point where the arm is mounted, that the arm will strike the stop before the platen delivers its blow, whereby the platen will be caused to deliver a sharp, whip-like blow.

3. The combination of a platen, a device for actuating the platen to cause it to deliver a blow, a spring-pressed part movably mounted upon the platen-support and having a portion projecting into the path of movement of the actuating device adapted to be struck and moved by the platen-actuating device, as the latter moves in one direction, a stop for the spring-pressed part secured to the platen-support, a spring for normally holding the spring-pressed part against the stop, whereby, when the platen-actuating device moves in one direction, it will strike, move and pass by the projection of the spring-pressed part without actuating the platen, but, when it moves in the other direction, it will strike and move the spring-pressed part and the platen-support, and actuate the platen.

4. The combination of a platen mounted upon a rock-shaft, a device for actuating the rock-shaft to cause the platen to deliver a blow, a sleeve movably mounted upon the rock-shaft and having a portion projecting into the path of movement of the actuating device adapted to be struck and moved by the platen-actuating device, as the latter moves in one direction, a stop for the sleeve secured to the rock-shaft, a spring for normally holding the sleeve against the stop, whereby, when the platen-actuating device moves in one direction, it will strike, move and pass by the projection of the sleeve to revolve the sleeve on the rock-shaft without rocking the latter, but, when it moves in the other direction, it will strike and revolve the sleeve and rock the rock-shaft and actuate the platen.

5. The combination of a platen mounted upon a rock-shaft, a platen-actuating spring to hold the platen normally in printing position, a device for actuating the rock-shaft to cause the platen to deliver a blow, a sleeve movably mounted upon the rock-shaft and having a portion projecting into the path of movement of the actuating device adapted to be struck and moved by the platen-actuating device, as the latter moves in one direction, a stop for the sleeve secured to the rock-shaft, a spring for normally holding the sleeve against the stop, whereby, when the platen-actuating device moves in one direction, it will strike, move and pass by the projection of the sleeve to revolve the sleeve on the rock-shaft without rocking the latter, but when it moves in the other direction, it will strike and revolve the sleeve and rock the rock-shaft, and strain the platen-actuating spring, and then release the sleeve and rock-shaft to permit the platen-actuating spring to cause the platen to deliver a blow.

6. In a workmen's time-recorder the combination with suitable impression mechanism, and means for feeding a record-surface, of a shutter or cover adapted normally to cover an opening over against the record-surface and adapted to be moved away to expose the record-surface, a lock for the shutter to prevent its removal from the opening, an operating device for actuating the impression mechanism and for feeding forward the record-surface connected with the lock and shutter and adapted to remove the lock and withdraw the shutter when the impression mechanism is operated and to return the parts to their normal positions when the printing has been completed.

7. In a workmen's time-recorder the combination with suitable impression mechanism, of a movable shutter or cover adapted normally to cover an opening over against a record-surface and adapted to be moved away to expose the record-surface, a lock for the shutter to prevent its removal from the opening, an operating device for actuating the impression mechanism connected with the lock and shutter and adapted to remove the lock and withdraw the shutter when the impression mechanism is operated and to return the parts to their normal positions when the printing has been completed.

8. In a workmen's time-recorder the combination of time-recording mechanism driven synchronously by a clock-movement, impression mechanism, a cover or shutter for an opening in the casing of the machine adapted to permit the workman to write upon a recording-strip adapted to pass thereunder, means for moving the cover to open or close the opening and an operating device connected and adapted to operate the impression mechanism and to move the cover to expose or hide the recording-strip.

9. In a workmen's time-recorder the combination of time-recording mechanism driven synchronously by a clock-movement, impression mechanism, a recording-strip adapted to pass an opening in the casing of the machine to permit the workman to write upon the strip, means for feeding forward the recording-strip, a cover or shutter for the opening, means for moving the cover to open or close the opening, and an operating device connected with and adapted to operate the impression mechanism, and to move the cover to expose or hide the recording-strip and to feed forward the recording-strip.

10. In a time-recorder the combination of an hour-wheel provided with type representing the hours, with the line of direction of the figures composing the type transverse to the plane of the hour-wheel, and a minute-recording wheel provided with a series of type representing minutes arranged in staggered order around the periphery of the wheel and with the line of direction of the figures composing the type transverse to the plane of the wheel, whereby the numbers representing the hour and minute when the time-recorder is operated will be printed upon the recording-strip in a vertical line and the number representing the next adjoining minute character upon the minute-wheel on either side will, if printed at all upon the record-strip, be printed out of said vertical line.

In testimony whereof I have signed my name to this specification in the presence of two subscribing witnesses.

WILLARD L. BUNDY.

Witnesses:
W. H. WILCOX,
H. P. CHURCH.